(12) United States Patent
Bittner

(10) Patent No.: US 6,394,530 B1
(45) Date of Patent: May 28, 2002

(54) VEHICLE DOOR WINDOW LIGHT REFLECTING DEVICE

(76) Inventor: William D. Bittner, 7058 Lanhabra Ave., Yucca Valley, CA (US) 92284

( * ) Notice: Subject to any disclaimer, the term of this patent is extended or adjusted under 35 U.S.C. 154(b) by 0 days.

(21) Appl. No.: 09/775,449

(22) Filed: Feb. 2, 2001

(51) Int. Cl.$^7$ .................................................. B60J 3/00
(52) U.S. Cl. ................. 296/152; 296/97.9; 160/370.21; 160/DIG. 3
(58) Field of Search .............................. 296/97.1, 97.2, 296/97.3, 97.9, 152; 160/DIG. 2, DIG. 3, 370.21, 351, 105

(56) References Cited

U.S. PATENT DOCUMENTS

| | | | | |
|---|---|---|---|---|
| 2,242,606 A | * | 5/1941 | Duncan | .................. 296/152 X |
| 2,917,111 A | * | 12/1959 | Clarke | .................... 296/152 X |
| 3,489,457 A | | 1/1970 | Pike | |
| 4,261,649 A | * | 4/1981 | Richard | ................. 296/97.2 X |
| 4,560,251 A | * | 12/1985 | Murjahn | ................. 296/152 X |
| 4,746,162 A | | 5/1988 | Maness | |
| 4,921,296 A | * | 5/1990 | Gruber | ...................... 296/97.2 |
| 5,022,701 A | | 6/1991 | Thompson, II | |
| 5,033,786 A | | 7/1991 | Bickford | |
| 5,362,119 A | * | 11/1994 | Rosentratter | ............... 296/97.8 |
| 5,533,778 A | * | 7/1996 | Sheridan | ..................... 296/152 |
| D375,714 S | | 11/1996 | Laidley | |
| 5,730,484 A | * | 3/1998 | Robinson | ................... 296/97.6 |
| 5,957,524 A | | 9/1999 | Feder | |
| 6,120,085 A | * | 9/2000 | Wooldridge | ............... 296/97.8 |

FOREIGN PATENT DOCUMENTS

| | | | |
|---|---|---|---|
| DE | 3807694 A1 | * | 9/1989 |
| FR | 2571448 A1 | * | 4/1986 |

* cited by examiner

Primary Examiner—Joseph D. Pape
Assistant Examiner—Patricia Engle

(57) ABSTRACT

A vehicle door window light reflecting device for preventing sunlight from striking the arm of a vehicle occupant which is adjacent to a door window. The vehicle door window light reflecting device includes a substantially rigid panel having a top edge, a bottom edge, a first side edge and a second side edge. The panel is generally opaque. The panel has a generally rectangular shape. A securing member is attached to the panel for removably coupling the panel to a vehicle window frame slot.

9 Claims, 2 Drawing Sheets

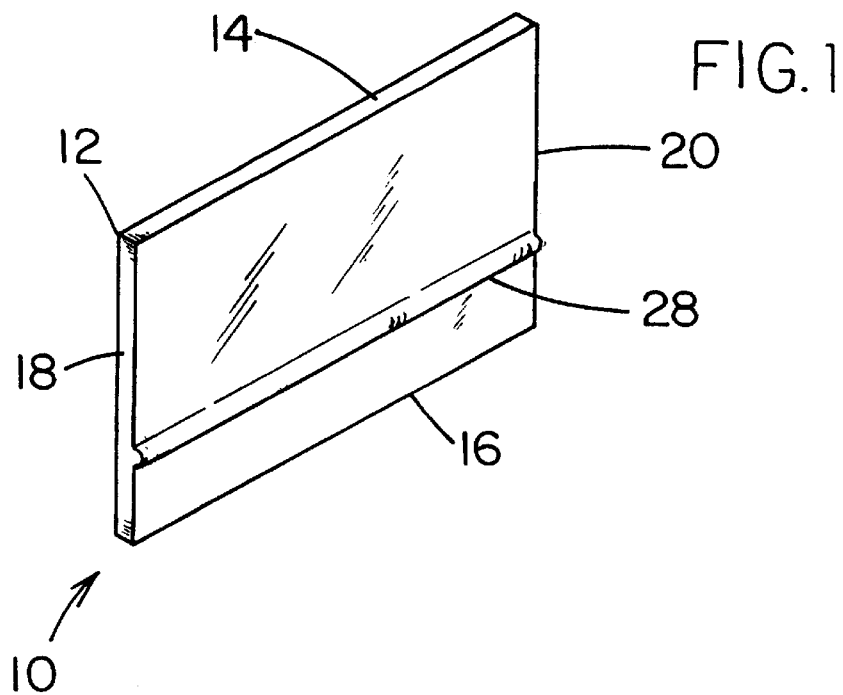
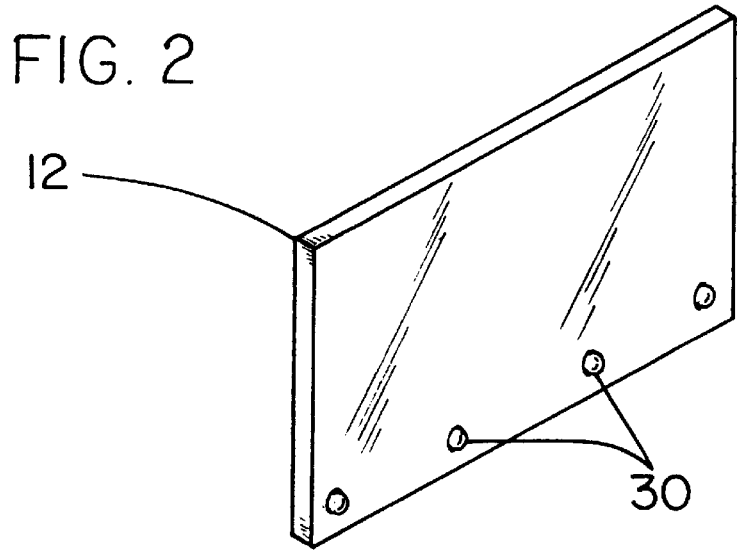

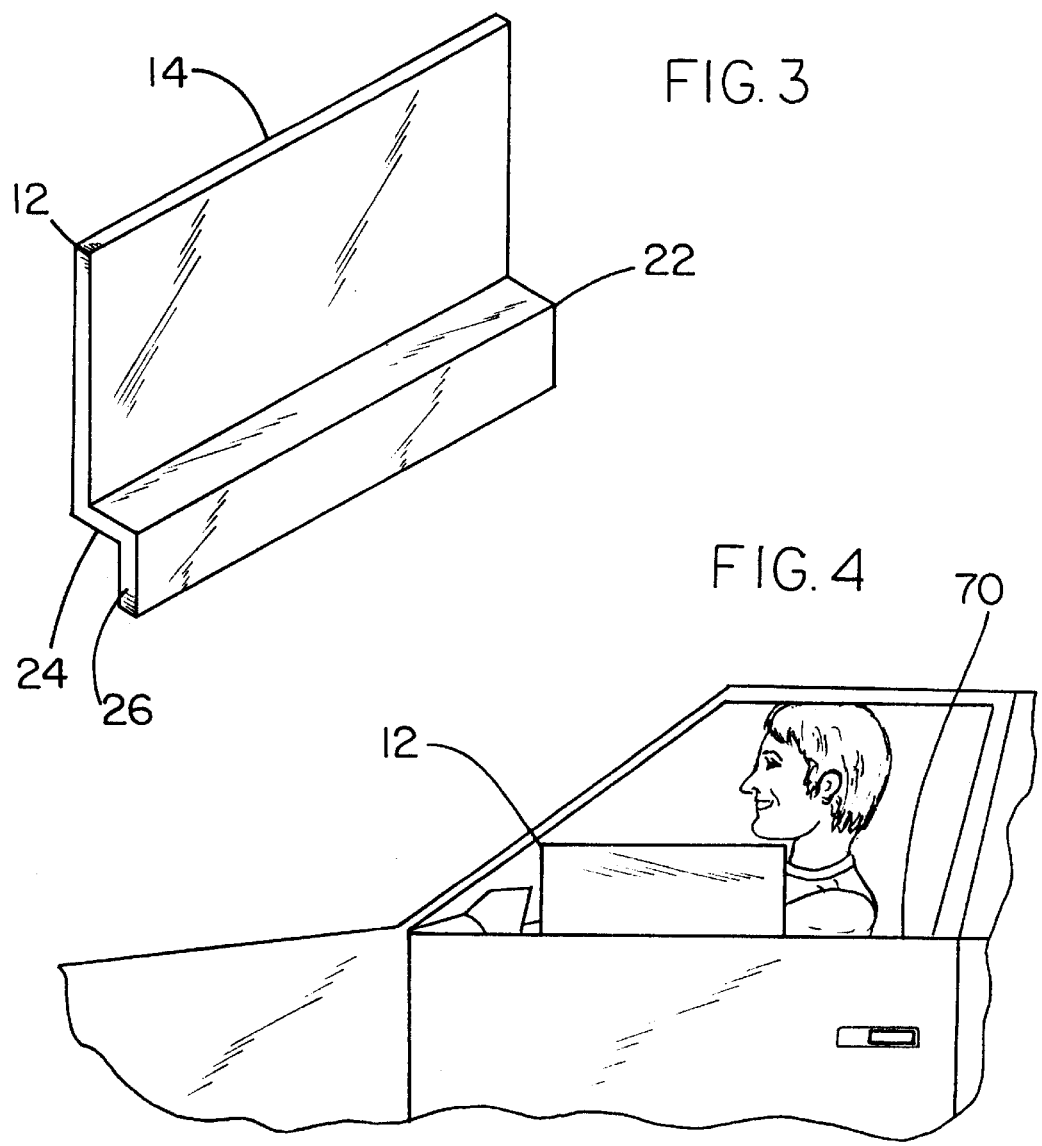

VEHICLE DOOR WINDOW LIGHT REFLECTING DEVICE

BACKGROUND OF THE INVENTION

1. Field of the Invention

The present invention relates to sun reflecting devices and more particularly pertains to a new vehicle door window light reflecting device for preventing sunlight from striking the arm of a vehicle occupant which is adjacent to a door window.

2. Description of the Prior Art

The use of sun reflecting devices is known in the prior art. More specifically, sun reflecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,957,524; U.S. Pat. No. 5,033,786; U.S. Pat. No. 3,489,547; U.S. Des. Pat. No. 375,714; U.S. Pat. No. 5,022,701; U.S. Pat. No. 4,746,162.

While these devices fulfill their respective, particular objectives and requirements, the aforementioned patents do not disclose a new vehicle door window light reflecting device. The inventive device includes a substantially rigid panel having a top edge, a bottom edge, a first side edge and a second side edge. The panel is generally opaque. The panel has a generally rectangular shape. A securing member is attached to the panel for removably coupling the panel to a vehicle window frame slot.

In these respects, the vehicle door window light reflecting device according to the present invention substantially departs from the conventional concepts and designs of the prior art, and in so doing provides an apparatus primarily developed for the purpose of preventing sunlight from striking the arm of a vehicle occupant which is adjacent to a door window.

SUMMARY OF THE INVENTION

In view of the foregoing disadvantages inherent in the known types of sun reflecting devices now present in the prior art, the present invention provides a new vehicle door window light reflecting device construction wherein the same can be utilized for preventing sunlight from striking the arm of a vehicle occupant which is adjacent to a door window.

The general purpose of the present invention, which will be described subsequently in greater detail, is to provide a new vehicle door window light reflecting device apparatus and method which has many of the advantages of the sun reflecting devices mentioned heretofore and many novel features that result in a new vehicle door window light reflecting device which is not anticipated, rendered obvious, suggested, or even implied by any of the prior art sun reflecting devices, either alone or in any combination thereof.

To attain this, the present invention generally comprises a substantially rigid panel having a top edge, a bottom edge, a first side edge and a second side edge. The panel is generally opaque. The panel has a generally rectangular shape. A securing member is attached to the panel for removably coupling the panel to a vehicle window frame slot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new vehicle door window light reflecting device apparatus and method which has many of the advantages of the sun reflecting devices mentioned heretofore and many novel features that result in a new vehicle door window light reflecting device which is not anticipated, rendered obvious, suggested, or even implied by any of the prior art sun reflecting devices, either alone or in any combination thereof.

It is another object of the present invention to provide a new vehicle door window light reflecting device which may be easily and efficiently manufactured and marketed.

It is a further object of the present invention to provide a new vehicle door window light reflecting device which is of a durable and reliable construction.

An even further object of the present invention is to provide a new vehicle door window light reflecting device which is susceptible of a low cost of manufacture with regard to both materials and labor, and which accordingly is then susceptible of low prices of sale to the consuming public, thereby making such vehicle door window light reflecting device economically available to the buying public.

Still yet another object of the present invention is to provide a new vehicle door window light reflecting device which provides in the apparatuses and methods of the prior art some of the advantages thereof, while simultaneously overcoming some of the disadvantages normally associated therewith.

Still another object of the present invention is to provide a new vehicle door window light reflecting device for preventing sunlight from striking the arm of a vehicle occupant which is adjacent to a door window.

Yet another object of the present invention is to provide a new vehicle door window light reflecting device which includes a substantially rigid panel having a top edge, a bottom edge, a first side edge and a second side edge. The panel is generally opaque. The panel has a generally rectangular shape. A securing member is attached to the panel for removably coupling the panel to a vehicle window frame slot.

Still yet another object of the present invention is to provide a new vehicle door window light reflecting device that is retrofittable to existing vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new vehicle door window light reflecting device according to the present invention.

FIG. 2 is a schematic perspective view of the present invention.

FIG. 3 is a schematic perspective view of the present invention.

FIG. 4 is a schematic side in-use view of the present invention.

DESCRIPTION OF THE PREFERRED EMBODIMENT

With reference now to the drawings, and in particular to FIGS. 1 through 4 thereof, a new vehicle door window light reflecting device embodying the principles and concepts of the present invention and generally designated by the reference numeral 10 will be described.

As best illustrated in FIGS. 1 through 4, the vehicle door window light reflecting device 10 generally comprises a substantially rigid panel 12 having a top edge 14, a bottom edge 16, a first side edge 18 and a second side edge 20. The panel 12 is generally opaque. The panel 12 has a generally rectangular shape. The bottom edge 16 has a length generally between 9 inches and 15 inches. The first side edge 18 has a height generally between 5 inches and 8 inches.

A securing member is attached to the panel for removably coupling the panel to a conventional car window frame slot 70. The securing member in FIG. 3 comprises a bracket 22 having an arm portion 24 coupled to a leg portion 26. The arm portion 24 has a free edge coupled to and extending along a length of the bottom edge 16 of the panel 12 such that the arm portion 24 is orientated generally perpendicular to a plane of the panel 12 and the leg portion 26 extends downward. The leg portion 26 is extendable into the window frame slot.

The securing member in FIG. 1 comprises a ridge 28 attached to a first side of said panel 12 and extends between the first 18 and second 20 side edges. The ridge 28 is positioned nearer the bottom edge 16 than the top edge 14 and orientated generally parallel to the bottom edge 16. The bottom edge 16 is positionable in the window frame slot 70 such that the ridge 28 abuts a top edge of the slot 70.

The securing member in FIG. 2 comprises a plurality of protruding members 30 outwardly biased from a first side of the panel. Each of the protruding members 30 is positioned generally nearer the bottom edge 16 than the top edge 14. Each of the protruding members 30 is positioned along a line orientated generally parallel to the bottom edge 16. The bottom edge 16 is extendable in the window frame slot 70 such that the outwardly protruding members 30 frictionally engage the window frame.

In use, the device is placed in the window frame slot of a vehicle such that the panel extends upwardly from slot. The panel prevents sunlight from striking the arm of the person sitting adjacent to the panel for preventing the arm from being sunburned.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sun shield device for being removably positioned in a vehicle window frame slot, said device comprising:

a panel being substantially rigid and having a top edge, a bottom edge, a first side edge and a second side edge, said panel being opaque such that light does not pass through said panel, said panel having a generally rectangular shape; and a securing member being attached to said panel for removably coupling said panel to the vehicle window frame slot, said securing member comprising a bracket having an arm portion and a leg portion, said leg portion having an upper margin coupled to and not extending beyond said arm portion;

wherein said arm portion has a free edge being coupled to said bottom edge of said panel such that said arm portion is orientated generally perpendicular to a plane of said panel, said leg portion extending substantially perpendicularly to said arm portion such that said arm portion offsets a plane of the leg portion from a plane of the panel, said panel terminating at said arm portion such that a shoulder is formed by said arm portion and the bottom edge of said panel for resting on the window frame when said leg portion is extended into the window frame slot.

2. In combination, the device of claim 1, and a vehicle having a vehicle window frame, said window frame having a bottom portion having a slot therein for removably receiving a window, said leg portion being inserted into said slot for removably coupling said device to said window frame.

3. The sun shield device as in claim 1, wherein said bottom edge of said panel has a length generally between 9 inches and 15 inched, said first side edge having a height generally between 5 inches and 8 inches.

4. A sun shield device for being removably positioned in a vehicle window frame slot, said device comprising:

a panel being substantially rigid and having a top edge, a bottom edge, a first side edge and a second side edge, said panel being opaque such that light does not travel through said panel, said panel having a generally rectangular shape; and a securing member being attached to said panel for removably coupling said panel to said vehicle window frame slot, said securing member comprising a ridge being attached to a first side of said panel and extending between said first and second side edges, said ridge being positioned nearer said bottom edge than said top edge and being orientated generally parallel to said bottom edge, said ridge extending outwardly from the first side of the panel and a portion of the first side between said ridge and said bottom edge being substantially planar and free from protrusions so that when said bottom edge of said panel is removably inserted in the window frame slot, said ridge is abuttable against and rest upon a top edge of said slot to resist further insertion of the panel into the slot.

5. The sun shield device as in claim 4, wherein said bottom edge of said panel has a length generally between 9 inches and 15 inched, said first side edge having a height generally between 5 inches and 8 inches.

6. In combination, the device of claim 4, and a vehicle having a vehicle window frame, said window frame having a bottom portion having a slot therein for removably receiving a window, said bottom edge being of said panel being inserted into said slot such that said ridge is abutting said window frame.

7. A sun shield device for being removably positioned in a vehicle window frame slot, said device comprising:

a panel being substantially rigid and having a top edge, a bottom edge, a first side edge and a second side edge, said panel being opaque such that light does not travel through said panel, said panel having a generally rectangular shape; and a securing member being attached to said panel for removably coupling said panel to said vehicle window frame slot, said securing member comprising a plurality of protruding members outwardly biased from a first side of said panel, each of said protruding members being positioned generally nearer said bottom edge than said top edge and being positioned along a line and being spaced from each other along said line, said line being orientated generally parallel to said bottom edge so that when said bottom edge is removably extended in the window frame slot, said outwardly protruding members frictionally engage the window frame.

8. The sun shield device as in claim 7, wherein said bottom edge of said panel has a length generally between 9 inches and 15 inched, said first side edge having a height generally between 5 inches and 8 inches.

9. In combination, the device of claimed 7, and a vehicle having a vehicle window frame, said window frame having a bottom portion having a slot therein for removably receiving a window, said bottom edge of said panel and said protruding members being inserted into said slot for removably coupling said device to said window frame.

* * * * *